US008959028B2

(12) United States Patent
Canter et al.

(10) Patent No.: US 8,959,028 B2
(45) Date of Patent: Feb. 17, 2015

(54) APPARATUS AND METHOD FOR MONITORING AND CONTROL OF REMOTELY LOCATED EQUIPMENT

(75) Inventors: James M. Canter, Austin, TX (US); Bryan W. Godwin, Round Rock, TX (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 2128 days.

(21) Appl. No.: 11/772,533

(22) Filed: Jul. 2, 2007

(65) Prior Publication Data

US 2009/0013028 A1 Jan. 8, 2009

(51) Int. Cl.
*G06Q 20/00* (2012.01)
*H04L 29/08* (2006.01)
*G06G 1/14* (2006.01)
*G06Q 10/00* (2012.01)
*G07F 19/00* (2006.01)
*G07B 17/00* (2006.01)
*H04L 12/24* (2006.01)

(52) U.S. Cl.
CPC ............. *H04L 67/02* (2013.01); *H04L 41/0213* (2013.01)
USPC .................... 705/16; 705/22; 705/28; 705/30

(58) Field of Classification Search
USPC ................................................ 705/22, 28, 16
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A | 10/1983 | Sedam et al. | 364/479 |
| 4,454,670 A | 6/1984 | Bachmann et al. | 40/584 |
| 4,553,211 A | 11/1985 | Kawasaki et al. | 364/479 |
| 4,611,205 A | 9/1986 | Eglise | 340/825.35 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |
| 4,926,996 A | 5/1990 | Eglise et al. | 194/212 |
| 4,954,697 A | 9/1990 | Kokubun et al. | 235/381 |
| 5,029,098 A | 7/1991 | Levasseur | 364/479 |
| 5,077,582 A | 12/1991 | Kravette et al. | 355/206 |

(Continued)

FOREIGN PATENT DOCUMENTS

DE 41 40 450 A1 6/1993 ................ G07F 9/02
EP 0 564 736 A1 10/1993 .............. G07F 17/42

(Continued)

OTHER PUBLICATIONS

Skywire Provides Details of Wireless ' VendView' System; Vending Times, Sep. 1994.

(Continued)

*Primary Examiner* — Ig T An

(57) ABSTRACT

A remote data acquisition and transmission system for vending machines may be provided. The system may comprise a vending machine and at least one host device. The vending machine may comprise a vending machine controller; and an Internet Protocol (IP) network interface operable to communicate operation data to and from the vending machine controller. The at least one host device may be communicatively coupled to the IP network interface via at least one IP network, and the host device may be operable to communicate operation data to and from the IP network interface.

54 Claims, 4 Drawing Sheets

(56) References Cited

U.S. PATENT DOCUMENTS

| | | | |
|---|---|---|---|
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |
| 5,282,127 A | 1/1994 | Mii | 364/479 |
| 5,323,155 A | 6/1994 | Iyer et al. | 341/51 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/228 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | 455/466 |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | 364/559 |
| 5,867,688 A | 2/1999 | Simmon et al. | 395/500 |
| 5,892,758 A | 4/1999 | Argyroudis | 370/335 |
| 5,898,904 A | 4/1999 | Wang | 455/31.3 |
| 5,905,442 A | 5/1999 | Mosebrook et al. | 340/3.7 |
| 5,905,882 A | 5/1999 | Sakagami et al. | 700/86 |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | 370/389 |
| 5,950,630 A | 9/1999 | Portwood et al. | 128/897 |
| 5,956,487 A | 9/1999 | Venkatraman et al. | 709/218 |
| 5,957,262 A | 9/1999 | Molbak et al. | 194/200 |
| 5,959,536 A | 9/1999 | Chambers et al. | 710/104 |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | 709/206 |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | 455/403 |
| 6,021,437 A | 2/2000 | Chen et al. | 709/224 |
| 6,029,143 A | 2/2000 | Mosher et al. | 705/28 |
| 6,032,202 A | 2/2000 | Lea et al. | 710/8 |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,109,524 A | 8/2000 | Kanoh et al. | 235/381 |
| 6,119,053 A | 9/2000 | Taylor et al. | 700/231 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | 705/400 |
| 6,272,395 B1 | 8/2001 | Brodbeck | 700/236 |
| 6,289,453 B1 | 9/2001 | Walker et al. | 713/175 |
| 6,304,895 B1 | 10/2001 | Schneider et al. | 709/203 |
| 6,317,649 B1 | 11/2001 | Tedesco et al. | 700/232 |
| 6,324,520 B1 | 11/2001 | Walker et al. | 705/16 |
| 6,338,149 B1 | 1/2002 | Ciccone, Jr. et al. | 714/38 |
| 6,339,731 B1 | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,427,912 B1 | 8/2002 | Levasseur | 235/381 |
| 6,434,534 B1 | 8/2002 | Walker et al. | 705/14 |
| 6,437,692 B1 | 8/2002 | Petite et al. | 340/540 |
| 6,442,532 B1 | 8/2002 | Kawan | 705/35 |
| 6,457,038 B1 | 9/2002 | Defosse | 709/200 |
| 6,462,644 B1 | 10/2002 | Howell et al. | 340/5.92 |
| 6,467,685 B1 | 10/2002 | Teicher | 235/379 |
| 6,502,131 B1 | 12/2002 | Vaid et al. | 709/224 |
| 6,505,095 B1 | 1/2003 | Kolls | 700/244 |
| 6,516,327 B1 | 2/2003 | Zondervan et al. | |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B2 | 6/2003 | Roatis et al. | 292/199 |
| 6,584,309 B1 | 6/2003 | Whigham | 455/414 |
| 6,585,622 B1 | 7/2003 | Shum et al. | 482/8 |
| 6,604,086 B1 | 8/2003 | Kolls | 705/14 |
| 6,604,087 B1 | 8/2003 | Kolls | 705/14 |
| 6,606,602 B1 | 8/2003 | Kolls | 705/14 |
| 6,609,113 B1 | 8/2003 | O'Leary et al. | 705/39 |
| 6,615,623 B1 | 9/2003 | Ormerod | 70/224 |
| 6,695,166 B2 | 2/2004 | Long | 221/14 |
| 6,704,714 B1 | 3/2004 | O'Leary et al. | 705/39 |
| 6,712,266 B2 | 3/2004 | Bartley et al. | 235/380 |
| 6,714,977 B1 | 3/2004 | Fowler et al. | 709/224 |
| 6,735,630 B1 | 5/2004 | Gelvin et al. | 709/224 |
| 6,738,811 B1 | 5/2004 | Liang | 709/224 |
| 6,748,296 B2 | 6/2004 | Banerjee et al. | 700/241 |
| 6,751,562 B1 | 6/2004 | Blackett et al. | 702/61 |
| 6,754,558 B2 | 6/2004 | Preston et al. | 700/236 |
| 6,772,048 B1 | 8/2004 | Leibu et al. | 700/241 |
| 6,826,607 B1 | 11/2004 | Gelvin et al. | 709/224 |
| 6,832,251 B1 | 12/2004 | Gelvin et al. | 709/224 |
| 6,837,436 B2 | 1/2005 | Swartz et al. | 235/472.02 |
| 6,844,813 B2 | 1/2005 | Hardman | 340/539.1 |
| 6,850,252 B1 | 2/2005 | Hoffberg | 345/716 |
| 6,859,831 B1 | 2/2005 | Gelvin et al. | 709/224 |
| 6,867,685 B1 | 3/2005 | Stillwagon | 340/5.64 |
| 6,876,988 B2 | 4/2005 | Helsper et al. | 706/21 |
| 6,900,720 B2 | 5/2005 | Denison et al. | 340/5.9 |
| 6,925,335 B2 | 8/2005 | May et al. | 700/9 |
| 6,959,265 B1 | 10/2005 | Candela et al. | 702/186 |
| 6,973,475 B2 | 12/2005 | Kenyon et al. | 709/203 |
| 6,981,061 B1 | 12/2005 | Sakakura | |
| 7,017,085 B2 | 3/2006 | Braun | 714/47 |
| 7,076,329 B1 | 7/2006 | Kolls | 700/232 |
| 7,131,575 B1 | 11/2006 | Kolls | 235/379 |
| 7,152,783 B2 | 12/2006 | Charrin | |
| 7,191,034 B2 | 3/2007 | Whitten et al. | 700/244 |
| 7,286,901 B2 | 10/2007 | Whitten et al. | 700/244 |
| 8,191,779 B2 * | 6/2012 | Illingworth et al. | 235/381 |

(56) References Cited

U.S. PATENT DOCUMENTS

| | | | |
|---|---|---|---|
| 2001/0002210 A1 | 5/2001 | Petite | 379/155 |
| 2001/0034566 A1 | 10/2001 | Offer | 700/236 |
| 2001/0042121 A1 | 11/2001 | Defosse et al. | 709/224 |
| 2001/0047410 A1 | 11/2001 | Defosse | 709/224 |
| 2001/0054083 A1* | 12/2001 | Defosse | 709/217 |
| 2002/0005707 A1 | 1/2002 | Kerai et al. | |
| 2002/0016829 A1 | 2/2002 | Defosse | 709/217 |
| 2002/0024420 A1 | 2/2002 | Ayala et al. | 340/5.61 |
| 2002/0032470 A1 | 3/2002 | Linberg | 607/60 |
| 2002/0038432 A1 | 3/2002 | Hsu | |
| 2002/0050526 A1* | 5/2002 | Swartz et al. | 235/472.02 |
| 2002/0077724 A1 | 6/2002 | Paulucci et al. | 700/231 |
| 2002/0082665 A1 | 6/2002 | Haller et al. | 607/60 |
| 2002/0107610 A1 | 8/2002 | Kaehler et al. | 700/232 |
| 2002/0123966 A1* | 9/2002 | Chu et al. | 705/43 |
| 2002/0133581 A1* | 9/2002 | Schwartz et al. | 709/223 |
| 2002/0147598 A1 | 10/2002 | Smith et al. | |
| 2002/0169539 A1 | 11/2002 | Menard et al. | 701/200 |
| 2002/0194387 A1 | 12/2002 | Defosse | 709/251 |
| 2003/0003865 A1 | 1/2003 | Defosse et al. | 455/41 |
| 2003/0013482 A1 | 1/2003 | Brankovic | 455/553 |
| 2003/0050841 A1 | 3/2003 | Preston et al. | 705/16 |
| 2003/0061094 A1 | 3/2003 | Banerjee et al. | 705/14 |
| 2003/0074106 A1 | 4/2003 | Butler | |
| 2003/0097381 A1 | 5/2003 | Detweiler et al. | |
| 2003/0097474 A1 | 5/2003 | Defosse et al. | 709/246 |
| 2003/0101257 A1 | 5/2003 | Godwin | |
| 2003/0101262 A1 | 5/2003 | Godwin | 709/224 |
| 2003/0128101 A1 | 7/2003 | Long | 340/5.26 |
| 2003/0132282 A1* | 7/2003 | Workens | 235/379 |
| 2003/0158625 A1 | 8/2003 | Carstens et al. | |
| 2003/0204391 A1 | 10/2003 | May et al. | 704/8 |
| 2003/0217005 A1* | 11/2003 | Drummond et al. | 705/43 |
| 2004/0133653 A1 | 7/2004 | Defosse et al. | |
| 2004/0207509 A1 | 10/2004 | Mlynarczyk et al. | 340/5.23 |
| 2005/0131577 A1 | 6/2005 | Ota et al. | 700/242 |
| 2005/0161953 A1 | 7/2005 | Roatis et al. | 292/199 |
| 2005/0179544 A1 | 8/2005 | Sutton et al. | 340/543 |
| 2007/0096867 A1 | 5/2007 | Denison et al. | 340/5.23 |
| 2007/0100649 A1* | 5/2007 | Walker et al. | 705/1 |
| 2008/0195762 A1 | 8/2008 | Wood | |
| 2012/0215347 A1* | 8/2012 | Illingworth et al. | 700/241 |

FOREIGN PATENT DOCUMENTS

| | | | | |
|---|---|---|---|---|
| EP | 0 602 787 A2 | 10/1993 | | H04L 29/06 |
| EP | 0 817 138 A1 | 1/1998 | | G07F 9/00 |
| EP | 0 999 529 | 5/2000 | | G07F 9/02 |
| EP | 1096408 | 5/2001 | | G06F 17/60 |
| FR | 2 744 545 | 2/1996 | | G07F 11/32 |
| FR | 2 755776 | 5/1998 | | G06F 17/60 |
| JP | 04253294 | 9/1992 | | G07F 9/00 |
| JP | 6296335 A2 | 10/1994 | | H02J 13/00 |
| JP | 9198172 A2 | 7/1997 | | G06F 3/00 |
| JP | 10105802 | 4/1998 | | H04Q 7/38 |
| WO | WO 89/07807 | 8/1989 | | G07F 9/02 |
| WO | WO 95/04333 | 2/1995 | | G07F 9/02 |
| WO | WO 95/05609 | 2/1995 | | G01R 27/14 |
| WO | WO 97/09667 | 3/1997 | | G06F 1/00 |
| WO | WO 98/45779 | 10/1998 | | G06F 11/00 |
| WO | WO 99/23620 | 5/1999 | | G07F 9/02 |
| WO | WO 99/27465 | 6/1999 | | G06F 17/00 |
| WO | WO 99/36751 | 7/1999 | | G01G 9/00 |
| WO | WO 99/48065 | 9/1999 | | G07F 9/02 |
| WO | WO 00/04475 | 1/2000 | | G06F 17/60 |
| WO | WO 00/04476 | 1/2000 | | G06F 17/60 |
| WO | WO 00/31701 | 6/2000 | | G07F 9/02 |
| WO | WO 02/19281 | 3/2002 | | G07F 7/00 |

OTHER PUBLICATIONS

Wireless Communications Forum; vol. III, No. 1 pp. 25-30, Apr. 1995.
Left high and dry? Sold-out machine sends for Cokes; Nashville Banner, Aug. 16, 1995.
Leitch, Carolyn, "Coke machines signal when its time for a refill"; The Globe & Mail, Toronto, Ontario, Aug. 30, 1995.
Meet the Smart Coke Machine; The Sacramento Bee Business Technology; Wednesday, Aug. 30, 1995.
Skywire allows vendor tracking of pop stock and sales details; RCR, vol. 14, No. 17, Sep. 4, 1995.
International Search Report for PCT/US99/05983 7 pages, Aug. 13, 1999.
American Power Conversion Internet Article, "Lightning Advisor", at internet, <http://lightning.apcc.com>, May 10, 2000.
American Products Internet Article, "Product Information", at internet, <http://www.apc.com>, May 10, 2000.
NetBotz Internet Article, "Welcome to Netbotz" at internet <http:www.netbotz.com>, May 10, 2000.
*BT redcare Telemetry Vending Interface Unit (VIU)*, Antronics Ltd Case Study, <http:www.antronic.co.uk/portfolio/viu>, 4 pgs, 2001.
International Search Report PCT/US01/16749, Dec. 20, 2001.
International Search Report PCT/US01/15522, May 16, 2002.
International Search Report PCT US 01/41640, Aug. 21, 2002.
International Search Report PCT/US 01/31381, Nov. 7, 2002.
International Preliminary Examination Report PCT/US01/31381 (3 pages), May 12, 2003.
NAMA White Paper: Cashless Vending, The National Automatic Merchandising Association (34 pages), 2004.
International Search Report PCT/US 03/37776, May 17, 2004.
What is an iButton?, Maxim/Dallas, http://www.maxim-ic.com/products/ibutton/ibuttons/, 3 pages, Dec. 29, 2005.
Cashless—Definition from the Merriam-Webster Online Dictionary; 2 pages, Printed Sep. 9, 2008.
Office Action dated Jan. 7, 2011 in connection with U.S. Appl. No. 11/608,987.
Office Action dated Nov. 15, 2010 in connection with U.S. Appl. No. 11/299,607.
Office Action dated Jul. 26, 2010 in connection with U.S. Appl. No. 11/608,987.
Office Action dated Jun. 16, 2010 in connection with U.S. Appl. No. 11/691,789.
Office Action dated Jul. 23, 2010 in connection with U.S. Appl. No. 11/279,174.
Office Action dated Feb. 13, 2014 in connection with U.S. Appl. No. 11/608,987, 37 pages.

* cited by examiner

APPARATUS AND METHOD FOR MONITORING AND CONTROL OF REMOTELY LOCATED EQUIPMENT

RELATED APPLICATION

This application is related to U.S. patent application Ser. No. 11/279,174 entitled "Method and System for Interfacing a Machine Controller and a Wireless Network" filed Apr. 10, 2006, which is a continuation application of U.S. patent application Ser. No. 09/695,647 entitled "Method and System for Interfacing a Machine Controller and Wireless Network" filed Jun. 29, 2001, now U.S. Pat. No. 7,164,884.

This application is also related to application Ser. No. 11/608,987 entitled System, Method and Apparatus for Vending Machine Wireless Audit and Cashless Transaction Support" filed Dec. 11, 2006, which is a divisional application of U.S. patent application Ser. No. 10/722,954 entitled System, Method and Apparatus for Vending Machine Wireless Audit and Cashless Transaction Support" filed Nov. 24, 2003, now U.S. Pat. No. 7,167,892, which claims the benefit of U.S. provisional application No. 60/429,756 entitled "System and Method for Wireless Audit and Cashless Transaction Transport" filed Nov. 27, 2002 by Erin M. Defosse and claims the benefit of U.S. provisional application No. 60/480,626 entitled "System and Method for Auditing a Vending Machine" filed Jun. 23, 2003 by Erin M. Defosse and is a continuation-in-part of U.S. patent application Ser. No. 09/971,170 filed on Oct. 4, 2001 by Erin M. Defosse and entitled "Remote Data Acquisition, Transmission and Analysis System Including Handheld Wireless Equipment," which is a continuation of U.S. patent application Ser. No. 09/267,254 filed on Mar. 12, 1999 by Erin M. Defosse and entitled "Wide Area Network Operation's Center that Sends and Receives Data from Vending Machines," now U.S. Pat. No. 6,457,038 that claims priority to U.S. Provisional Patent Application Ser. No. 60/078,645, filed Mar. 19, 1998, and entitled "Remote Data Acquisition and Transmission System for the Monitoring and Control of Vending Machines," and U.S. Provisional Patent Application Ser. No. 60/099,434, filed Sep. 8, 1998, and entitled "Remote Data Acquisition and Transmission System."

This application is also related to copending Patent Application entitled "System, Method, and Apparatus for Identifying and Correcting Data Integrity Problems Associated with Remotely Located Equipment," application Ser. No. 11/691,789, filed Mar. 27, 2007.

This application is also related to copending Patent Application entitled "Apparatus and Method to Provide Multiple Wireless Communication Paths to and From Remotely Located Equipment", application Ser. No. 11/539,331, which is a continuation-in-part of U.S. patent application Ser. No. 11/279,174 entitled "Method and System for Interfacing a Machine Controller and a Wireless Network" filed Apr. 10, 2006, which is a continuation application of U.S. patent application Ser. No. 09/895,647 entitled "Method and System for Interfacing a Machine Controller and Wireless Network" filed Jun. 29, 2001, now U.S. Pat. No. 7,164,884.

This application is also related to copending Patent Application entitled "System and Method for Monitoring and Control of Beverage Dispensing Equipment", application Ser. No. 11/374,339, filed Mar. 13, 2006, which is a continuation of U.S. patent application Ser. No. 09/923,046 filed Aug. 6, 2001 and entitled "System and Method for Monitoring and Control of Beverage Dispensing Equipment", which claims priority to U.S. Provisional Patent Application Ser. No. 60/224,097 filed Aug. 9, 2000 and entitled "System and Method for Monitoring and Control of Beverage Dispensing Equipment"; and is a continuation-in-part of U.S. patent application Ser. No. 09/267,254 filed Mar. 12, 1999 entitled "Remote Data Acquisition and Transmission System" which claims priority to U.S. Provisional Patent Application Ser. No. 60/078,645, filed Mar. 19, 1998, and entitled "Remote Data Acquisition and Transmission System for the Monitoring and Control of Vending Machines" and U.S. Provisional Patent Application Ser. No. 60/099,434, filed Sep. 8, 1998, and entitled "Remote Data Acquisition and Transmission System."

TECHNICAL FIELD

The present disclosure relates in general to the field of remote data acquisition and transmission, and more particularly, to a method and system for interfacing a machine control system and a network for communicating information such as for monitoring and controlling distributed machines, such as vending machines.

BACKGROUND

Modern, electronic vending machines often contain microprocessor based control systems, sometimes referred to as "vending machine controllers." Such systems may be used to control, monitor and record detailed information about the state of an associated vending machine including, but not limited to, sales, cash received and paid out, errors, events, temperatures, inventory change, lock and unlock. A vending machine controller (VMC) may also control, monitor and record information from peripheral devices associated with functions such as coin acceptance, change giving, displays, credit cards and wireless transactions. The European Vending Association's Data Transfer Standard ("EVA-DTS") and the National Automatic Merchandising Association's (NAMA) Multi-Drop Bus/Internal Communications Protocol (MDB/ICP or MDB) are widely used formats for collecting, recording, transmitting and auditing data associated with vending machines.

Advances in electronics are now enabling the use of computer controls and data acquisition systems within each vending machine. Some of the latest vending machines make it possible for vending operators to download data and information associated with sales, inventory, and equipment status on-site onto portable computers or transmit vending machine data and information to a central location such as a network operations center. Many vending machines include vending machine controllers based on the International Multi-drop Bus (MDB) Interface Standards developed by the National Automatic Merchandising Association (NAMA).

Advances in electronics have also enabled the use of controls and data acquisition systems in other types of remotely located equipment, e.g., service vehicles, snack machines, beverage machines, automatic teller machines (ATMs), postage stamp dispensers, arcade machines, slot machines, laundry machines and car wash equipment, in addition to vending machines. However, there are many known disadvantages to such control and data acquisition systems in remotely located equipment. For example, known systems may require that, in order to retrieve data from an item of remotely located equipment at an Internet-enabled host remote from the equipment, a network operations center (NOC) with an Internet-enabled client-access point must be interfaced between the remotely located equipment and the host.

SUMMARY OF THE DISCLOSURE

Therefore, a need has arisen for systems and methods for interfacing a machine control system and a network for communicating information such as for monitoring and controlling distributed machines, e.g., vending machines, service vehicles, snack machines, beverage machines, automated teller machines, postage stamp dispensers, arcade machines, slot machines, laundry machines and car wash equipment. In accordance with teachings of the present disclosure, apparatus and methods may be presented for interfacing a machine control system and a network for communicating information for monitoring and controlling distributed machines, such as vending machines.

In one embodiment of the present disclosure, a remote data acquisition and transmission system for vending machines may comprise a vending machine and at least one host device. The vending machine may comprise a vending machine controller and an Internet Protocol (IP) network interface operable to communicate operation data to and from the vending machine controller. The at least one host device may be communicatively coupled to the IP network interface via at least one IP network, and the host device may be operable to communicate operation data to and from the IP network interface.

In another embodiment of the present disclosure, a remote data acquisition and transmission system for industrial machines may comprising an industrial machine and at least one host device. The industrial machine may comprise a controller and an IP network interface operable to communicate operation data to and from the controller. The at least one host device may be communicatively coupled to the IP network interface via at least one IP network, and the host device may be operable to communicate operation data to and from the IP network interface.

In yet another embodiment of the present disclosure, a method of remote data acquisition and transmission is disclosed. According to the method, at least one IP network interface may be interfaced with a remote vending machine, the IP network interface operable to communicate operation data to and from the remote vending machine. The at least one IP network interface may also be communicatively coupled to a host device operable to communicate operation data to and from the IP network interface. Operation data may be communicated between the IP network interface and the remote vending machine, and operation data may also be communicated between the host device and the IP network interface.

In yet another embodiment of the present disclosure, a method of remote data acquisition and transmission is disclosed. According to the method, at least one IP network interface is interfaced with a remote industrial machine, the IP network interface operable to communicate operation data to and from the remote industrial machine. The at least one IP network interface may also be communicatively coupled to a host device operable to communicate operation data to and from the IP network interface. Operation data may be communicated between the IP network interface and the remote industrial machine, and operation data may also be communicated between the host device and the IP network interface.

In yet another embodiment of the present disclosure, a vending machine comprises a controller and an IP network interface. The controller may be operable to control operations of the vending machine and to monitor vending machine operation data. The IP network interface may be operable to communicate operation data to and from the controller and communicate operation data with an IP network.

In yet another embodiment of the present disclosure, an audit device for auditing a vending machine may comprise a multi-drop bus (MDB) interface, a data exchange (DEX) interface, and an IP network interface. The MDB interface may be operable to communicate with an MDB interface of a vending machine controller (VMC) in the vending machine. The DEX interface may be operable for communicating with a DEX interface of the VMC in the vending machine. The IP network interface may be operable to communicate operation data with an IP network.

Technical benefits of the present disclosure may include eliminating or substantially reducing the amount of hardware or network devices necessary to monitor and control remotely located equipment. For example, by enabling an item of remotely located equipment to communicate via IP, a system for monitoring and controlling remotely located equipment may not require a network operations center with an Internet-enabled client access point.

All, some or none of these technical advantages may be present in various embodiments of the present disclosure. Other technical advantages will be readily apparent to one skilled in the art from studying the following figures, descriptions and/or claims.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Figure 1:
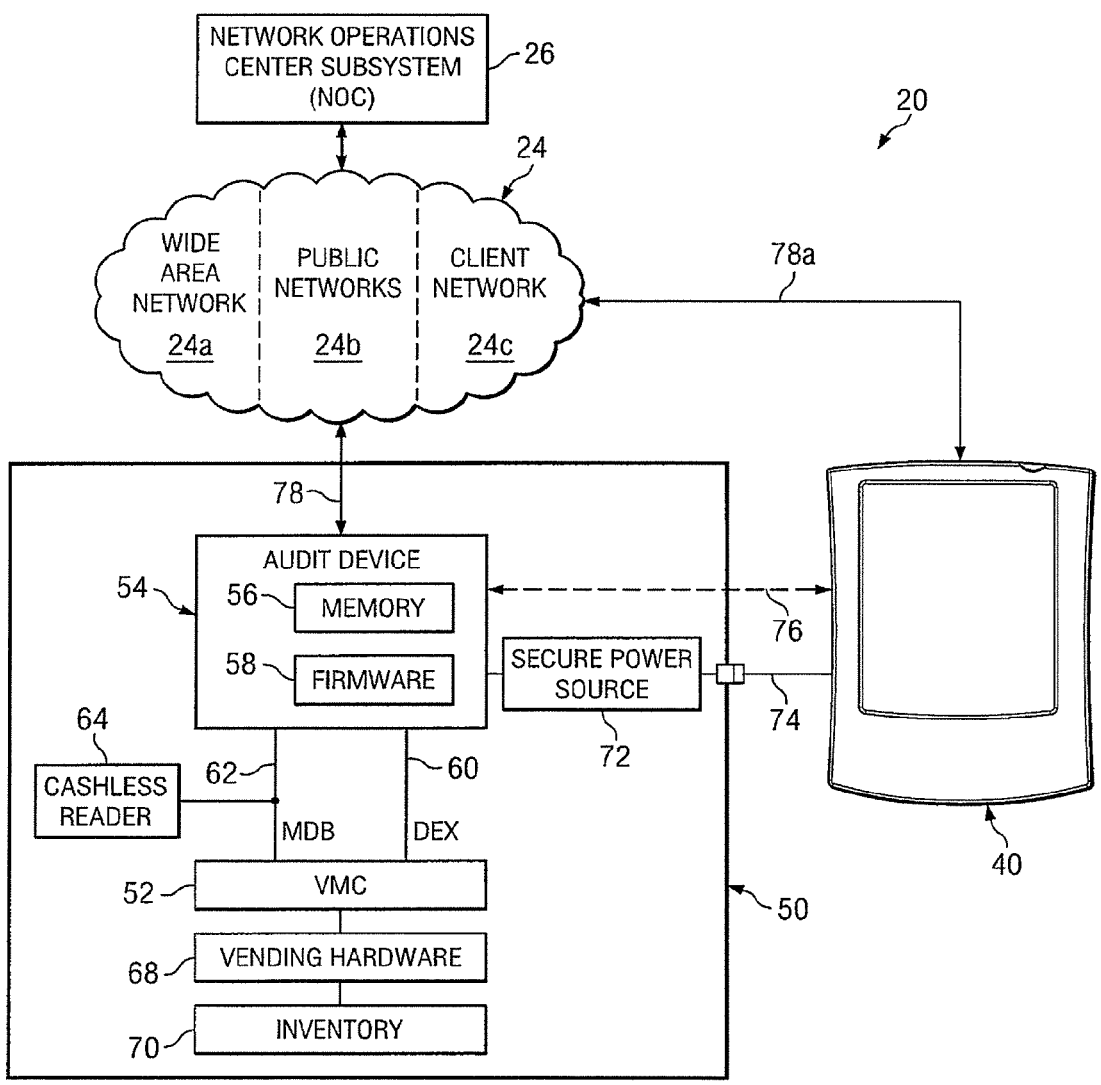
FIG. 1 is a block diagram showing a prior art system for communicating information between remotely located equipment and a network operations center using various communication techniques including a handheld device.

Preferred embodiments of the disclosure and various advantages are best understood by reference to FIGS. 1-4 wherein like numbers refer to same and like parts.

Various aspects of the present invention will be described with respect to remote point of sale equipment, remote dispensing equipment (e.g., vending machines), and other industrial machines and a host device associated with maintaining, controlling, and servicing such equipment. However, a remote data acquisition, transmission, and analysis system formed in accordance with teachings of the present invention may be used with a wide variety of industrial machines such as copiers, ice manufacturing and dispensing equipment, computer work stations, photographic booths, service vehicles, snack machines, beverage machines, automated teller machines, postage stamp dispensers, arcade machines, slot machines, laundry machines and car wash equipment and any other type of equipment or machine that requires routine maintenance, monitoring and servicing. According to teachings contained herein, remote point of sale equipment and remote dispensing equipment are not necessarily indicative of similar devices and, further, the present invention is not limited to use with only vending machines.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, ethernet cabling (10baseT, 100baseT, etc.), coaxial cables, T-1 lines, T-3 lines, ISDN lines, ADSL, etc.

The term "wireless transmissions" may be used to refer to all types of electromagnetic communications which do not require a wire, cable, or other types of conduits. Examples of wireless transmissions which may be used include, but are not limited to, personal area networks (PAN), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, such as IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 is a schematic drawing showing a block diagram of portions of a prior art system 20 for collecting, storing and communicating data and other information associated with operation of remotely located equipment such as, but not limited to, industrial machines and vending machines, e.g., beverage dispensing machines. The data may include the status of various components associated with the remotely located equipment and transactions conducted at the remotely located equipment including, but not limited to, locking and unlocking a door to provide access to interior portions of the remotely located equipment. In addition, the data may comprise operation data used to monitor and/or control remotely located equipment, e.g., dispensing and inventory data, cash levels, or equipment status data.

As depicted in FIG. 1, system 20 is used with vending machine 50. System 20 includes one or more handheld integration audit devices (handheld devices) 40. Vending machine 50 also includes vending machine controller (VMC) 52 operable to control and monitor various electronic components and mechanical components associated with vending machine 50. Vending machine 50 also includes audit device 54 having memory 56 and firmware 58.

Audit device 54 is operable to obtain data exchange (DEX) data via DEX interface or communication link 60 from vending machine controller 52. Audit device 54 is also operable to obtain multi-drop bus (MDB) data via MDB interface or communication link 62 from vending machine controller 52. Audit device 54 may also obtain MDB data from various peripherals including, but not limited to, cashless reader 64. Audit device 54 may archive or store the DEX data and MDB data in memory 56.

Audit device 54 of vending machine 50 is operable to communicate with handheld device 40. Communication link or interface 74 such as shown in FIG. 1 allows communication of electrical signals between handheld device 40 and audit device 54. Also, link 74 may provide electrical power from secure power source 72 to handheld device 40. Alternatively, in the event of an emergency at vending machine 50, handheld device 40 may provide electrical power through link 74 to operate audit device 54.

When handheld device 40 and audit device 54 communicate with each other over wire-line link 74 or wireless communication link 76, DEX data and MBD data stored in memory 56 are transferred on demand to handheld device 40. In addition to DEX data and MDB data, audit device 54 records and stores other transactions or activities associated with vending machine 50. For example audit device 54 may record information concerning transactions such as the frequency, date and time and the identity of each engagement and disengagement of an electronic lock (not shown). In addition, audit device 54 records operational matters such as compressor failure, vend failures, inventory depletion, correct change events, user selected events as well as other data associated with modern electronic vending machine activities and transactions. Vending machine 50 also includes cashless reader 64 operable to accept noncash payment tokens such as credit cards, RFID (Radio Frequency Identification Devices) or other media representative of noncash payment.

Vending machine 50 includes vending hardware 68 and inventory 70. Examples of vending machine hardware 68 may include, but are not limited to, one or more inventory dispensing apparatus, one or more coin acceptance and verification mechanisms, one or more bill acceptance and validation mechanisms or any other hardware device associated with vending machines. Vending machine 50 also includes secure power source 72 operably coupled to audit device 54. For some applications secure power source 72 may be used to provide power to audit device 54 in the event of power failure to vending machine 50 or at other selected time periods.

Handheld device 40 may be operable to communicate with audit device 54. Audit device 54 and/or handheld device 40 is operable to provide location information using commercially available global positioning systems (GPS).

As depicted in FIG. 1, known systems and methods may require that system 20 include a network operations center (NOC) 26 interfacing with vending machine 50 and audit device 40. NOC 26 may communicate data with vending machine 50 and audit device 54 via communications networks such as wide area networks 24a, public communications networks 24b, client networks or private networks 24c. Audit device 54 may communicate with NOC 26 using communication link 78. Various types of wire-line transmissions and wireless transmission techniques may be used as part of communication link 78. Handheld device 40 may communicate with NOC 26 using communication link 78a.

Figure 2:
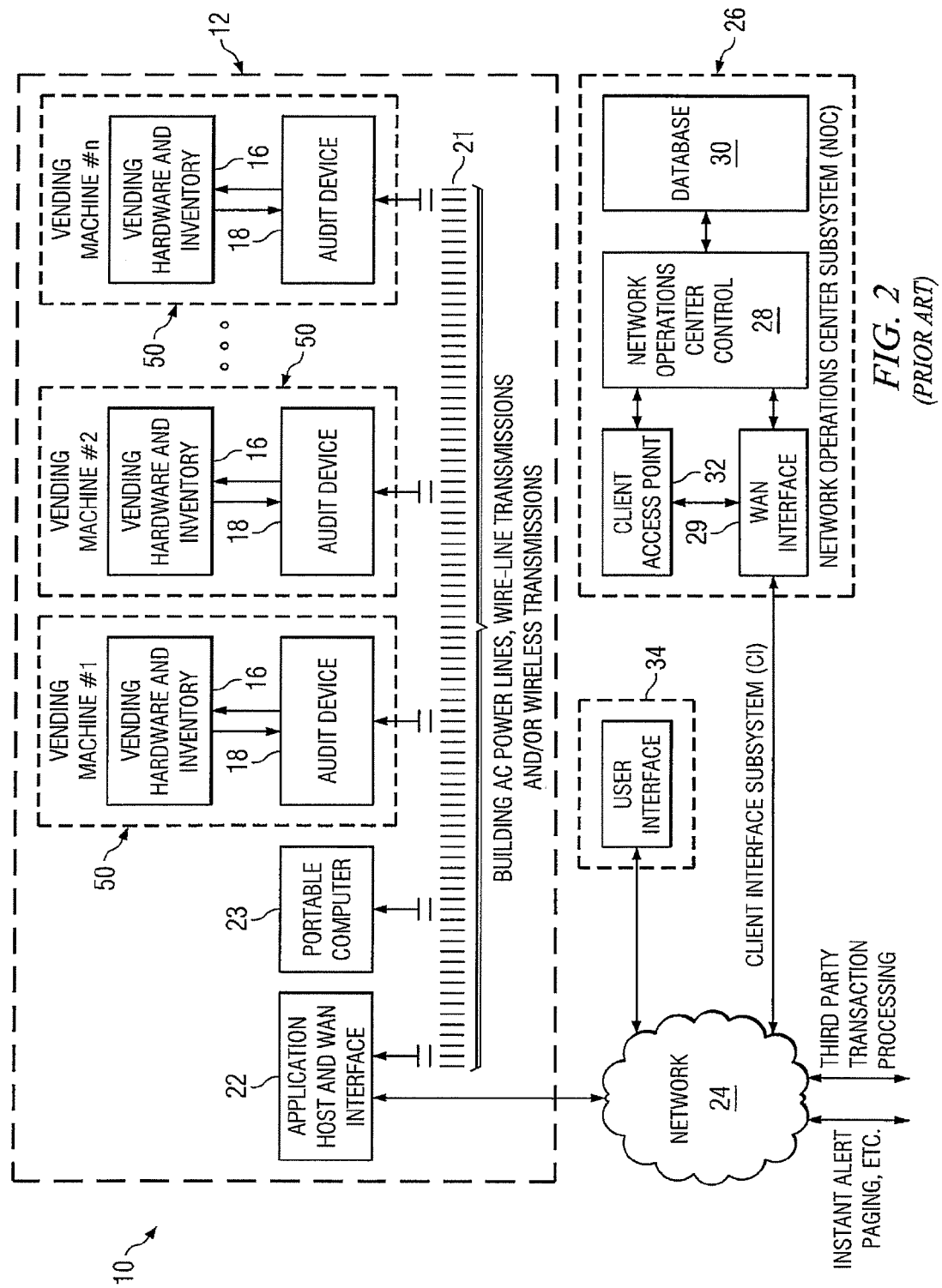
FIG. 2 illustrates a block diagram of vending machines interfaced through wireless or wire-line networks, in accordance with prior art.

FIG. 2 illustrates a block diagram of vending machines 50 interfaced through wireless or wire-line networks 24, in accordance with the prior art. A remote data acquisition system for vending machines, indicated generally at 10 communicates information from a vending site 12 externally over a wide area wireless network (WAN) and internally over a local area wireless network (LAN). As shown, the local area network at vending site 12 can be referred to as a vendor interrogation LAN subsystem (VIL). Vending site 12 may include only one vending machine 50 or a plurality of vending machines 50. As depicted, each vending machine 50 includes vending hardware and inventory 16 for performing vending functions and electronically tracking some vending information.

Vending machines 50 include application controllers 18 coupled to and interfacing with vending hardware and inventory 16. Application controllers 18 include a wireless and/or wire-line interface and a transceiver for WAN, LAN and point-to-point communications. Many vending machines 50 are equipped with a controller, e.g., vending machine controller 52, for controlling vending operations as well as tracking some vending events such as money received, change given and number of vends from each slot. Application controllers 18 communicate with such controllers and directly sense other vending events and vending equipment parameters (e.g., compressor performance). Application controllers 18 also communicate with one another and the application host 22 via onboard wireless and/or wire-line transceivers (not shown) using wireless and/or wire-line transmissions 21 (e.g., Ethernet and/or power-line transmissions).

Together, application controllers 18 and application host 22 form a LAN supported by the wireless or wire-line transmissions 21. In addition, application controllers 18 can also communicate directly with each other and with wide area network 24 to act as repeaters in case application host 22 cannot directly communicate with a particular application controller 18 while another application controller 18, which does have an established communication link with application host 22, can directly communicate.

As shown in FIG. 2, a network operations center (NOC) 26 communicates with one or more vending sites 12 across wide area network 24. Network operations center 26 can access mailboxes that store messages transmitted by application hosts 22 at vending sites 12. As depicted in FIG. 2, network operations center 26 includes a NOC control 28 that communicates with wide area network 24 through a WAN interface 29. NOC control 28 can receive data acquired from and transmit data to vending sites 12, process the data and store the data into a database 30. NOC control 28 can also perform instant alert paging, direct dial alarms and other functions to provide real time notification to a vending operator upon the occurrence of certain events (e.g., out-of-stock, power outage, vandalism, etc.). NOC control 28 can also provide third party transaction processing such as allowing queries on database 30. The WAN interface 29 between NOC control 28 and the wide area network 24 can be implemented through the use of either wire-line or wireless transmissions.

At network operations center 26, a client access point 32 provides access from a client interface subsystem (CI) 34 across external network 24. Client access point 32 can be a web-based interface allowing user access from a client's portable computer 23 across a network such as the Internet. Other implementations include providing a direct-dial connection between client interface subsystem 34 and client access point 32. Once connected, a user can use client interface subsystem 34 to obtain information from database 30 based upon data acquired from vending sites 12. Further, users can be provided with extended services such as trend information developed by mining and analyzing database 30.

Figure 3:
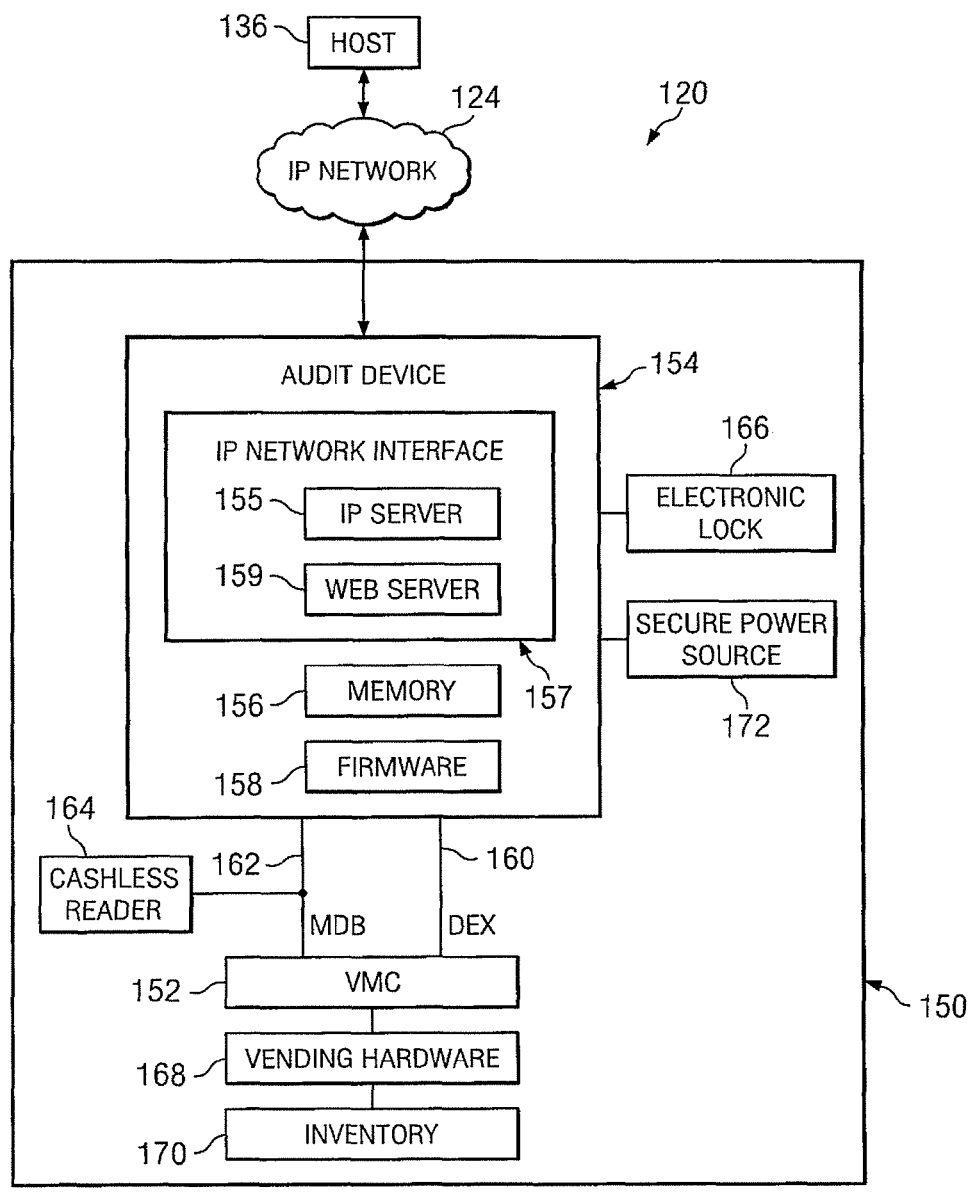
FIG. 3 illustrates a block diagram showing a system for communicating information between remotely located equipment and a host in accordance with the present disclosure.

FIG. 3 illustrates a block diagram showing a system 120 for communicating information and/or operation data between remotely located equipment, including but not limited to vending machines (e.g., beverage dispensing machines) and/or industrial machines, and a host device 136 in accordance with the present disclosure. The operation data may include the status of various components associated with the remotely located equipment and transactions conducted at the remotely located equipment including, but not limited to, locking and unlocking a door to provide access to interior portions of the remotely located equipment. In addition, operation data may comprise data used to monitor and/or control remotely located equipment, e.g., dispensing and inventory data, cash levels, or equipment status data.

System 120 may be satisfactorily used with vending machine 150 and/or other types of remotely located equipment. Vending machine 150 may include vending machine controller (VMC) 152 operable to control and monitor various electronic components and mechanical components associated with vending machine 150. Vending machine 150 may also include audit device 154 having memory 156 and firmware 158.

Audit device 154 may be operable to obtain DEX data via DEX interface or communication link 160 from vending machine controller 152. Audit device 154 may also be operable to obtain MDB data via MDB interface or communication link 162 from vending machine controller 152. Audit device 154 may also obtain MDB data from various peripherals including, but not limited to, cashless reader 164. Audit device 154 may archive or store the DEX data and MDB data in memory 156.

Vending machine 150 may also include an Internet Protocol (IP) network interface 157. In some embodiments, e.g., the embodiment depicted in FIG. 3, audit device 154 may comprise IP network interface 157. Via IP network interface 157, audit device 154 and/or another component of vending machine 150 may be operable to communicate over IP network 124 with one or more hosts 136. For some applications host device 136 and/or network interface 157 may be equipped with one or more wireless transceivers. Examples of wireless communications that may be satisfactorily used with host device 136 and network interface 157 include, but are not limited to, BLUETOOTH, IEEE802.11a, IEEE802.11b and IEEE802.11g. For some applications host device 136 and/or network interface 157 may include respective BLUETOOTH transceivers (not expressly shown). For some applications host device 136 and/or network interface 157 may be equipped with one or more wire-line transceivers.

IP network 124 such as shown in FIG. 3 may allow communication of signals between host device 136 and network interface 157. IP network 124, host device 136, and/or network interface 157 may each be configured to communicate over any IP-compatible protocol, including without limitation hypertext transfer protocol (HTTP), file transfer protocol (FTP), simple mail transfer protocol (SMTP), simple object access protocol (SOAP), and/or simple network management protocol (SNMP). When host device 136 and network interface 157 communicate with each other over IP network 124, information and/or operation data may be transferred from network interface 157 to host device 136, or vice versa. For example, DEX data and MBD data stored in memory 156 may be transferred on demand to host device 136. In addition to DEX data and MDB data, audit device 154 may record and store other transactions or activities associated with vending machine 150 which may also be transferred to host device 136 via IP network 124. As another example, audit device 154 may record information concerning transactions such as the frequency, date and time and the identity of each engagement and disengagement of an electronic lock 166. In addition, audit device 154 may record operational matters such as dispensing and operation data, cash levels, equipment status data, compressor failure, vend failures, inventory depletion, correct change events, user selected events as well as other data associated with modern electronic vending machine activities and transactions.

Vending machine 150 may include one or more hardware devices or peripheral devices operable to accept cash, noncash payment tokens and/or wireless payments. Cashless reader 164 may be representative of such hardware devices and peripherals. Cashless reader or cashless media device 164 may be operable to accept noncash payment tokens such as credit cards, RFID (Radio Frequency Identification Devices) or other media representative of noncash payment.

Vending machine 150 may include electronic lock 166 operably coupled with audit device 154. Electronic lock 166 may be commanded to engage or disengage in response to signals from audit device 154. Audit device 154 may operate electronic lock 66 by supplying appropriate power and/or digital control signals thereto. For example, audit device 154, via IP network 127 and IP network interface 124, may receive a command from host device 136 to initiate a sequence for unlocking electronic lock 166. Some vending machines and other types of remotely located equipment associated with data collecting, storing and communication system 20 may have only a mechanical locking device (not expressly shown) operated by a conventional key.

For some applications an electronic key (not expressly shown) may be used to initiate opening of an electronic lock. For such applications portions of an electronic reader (not expressly shown) may be disposed on exterior portions of vending machine 150. The electronic reader may be operable to respond to an electronic key and send an appropriate signal to audit device 154 to initiate a sequence for unlocking electronic lock 166.

The unlocking sequence may include a request from audit device 154 to electronic lock 166 to obtain a serial number associated with electronic lock 166. Audit device 154 may use a serial number or other information associated with electronic lock 166 to confirm that the electronic key is authorized for use in opening electronic lock 166 and associated vending machine 150. Handheld device 140 may also be used to initiate an unlocking sequence via audit device 154.

Vending machine 150 may include vending hardware 168 and inventory 170. Examples of vending machine hardware 168 may include, but are not limited to, one or more inventory dispensing apparatus, one or more coin acceptance and verification mechanisms, one or more bill acceptance and validation mechanisms or any other hardware device associated with vending machines. Vending machine 150 may also include secure power source 172 operably coupled to audit device 154. For some applications secure power source 172 may be used to provide power to audit device 154 in the event of power failure to vending machine 150 or at other selected time periods.

As shown in FIG. 3, IP network interface 157 may comprise IP server 155 and/or web server 159. IP server 155 may be operable to communicate over IP network 124 using any IP-compliant protocol, including without limitation hypertext transfer protocol (HTTP), file transfer protocol (FTP), simple mail transfer protocol (SMTP), simple object access protocol (SOAP), and simple network management protocol (SNMP). For example, in one embodiment, IP server 155 may be configured to generate e-mails comprising operation data, such e-mails deliverable to host device 136 or other component coupled to IP network 124. In the same or alternative embodiments, web server 159 may be configured to serve web pages comprising operation data and communicate such web pages via HTTP or other suitable protocol over IP network 124.

Figure 4:
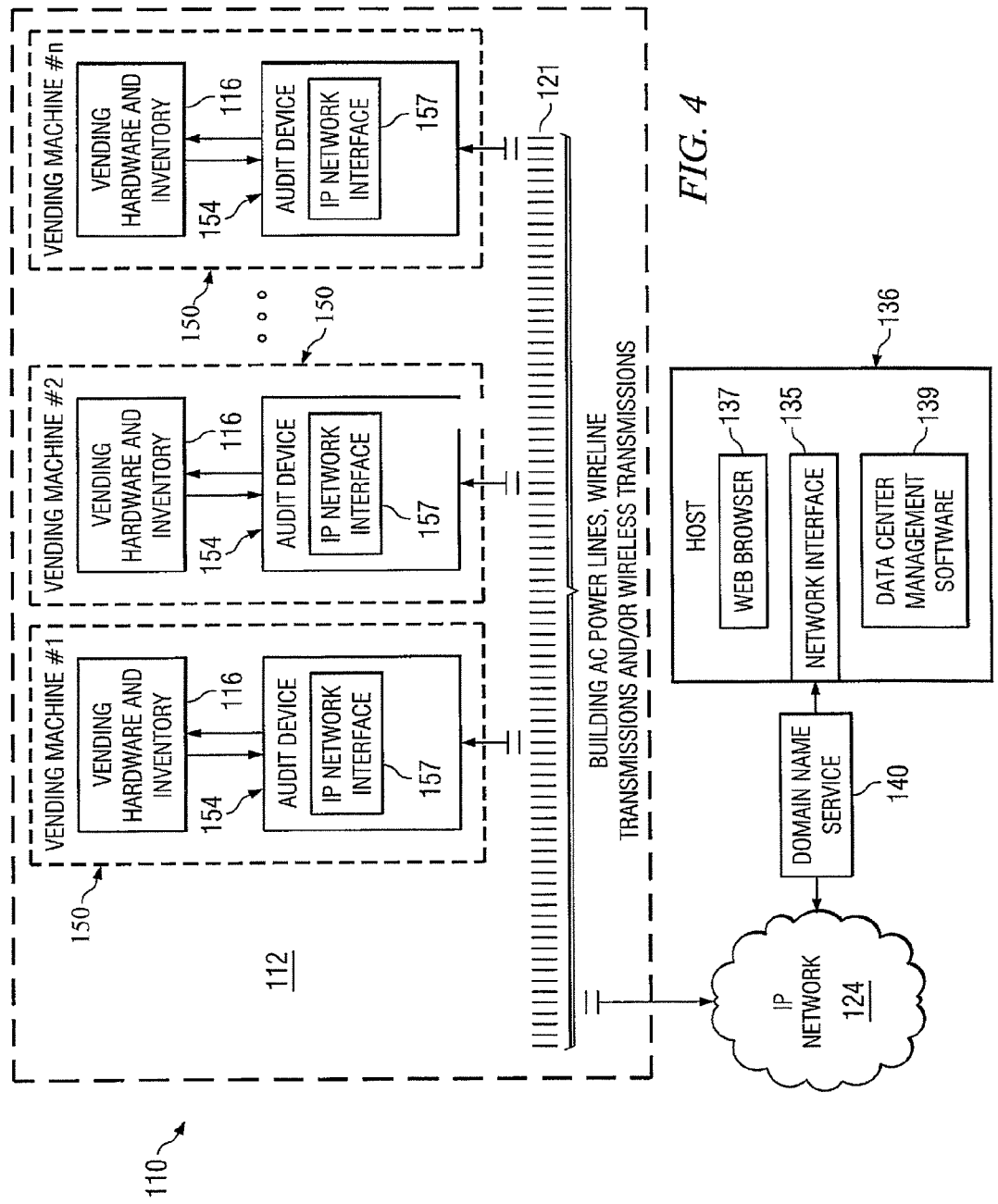
FIG. 4 illustrates a block diagram of vending machines interfaced with a host through wireless or wire-line networks, in accordance with the present disclosure.

FIG. 4 illustrates an example of a block diagram of vending machines 150 interfaced with a host device 136 through wireless or wire-line networks 124, in accordance with the present disclosure. A remote data acquisition system for vending machines, indicated generally at 110 communicates information from one or more vending machines 150 over an IP network 124. System 110 may include only one vending machine 150 or a plurality of vending machines 150. In addition, vending machines 150 can be located together at one remote location and/or placed at a plurality of remote locations. Each vending machine 150 may include vending hardware and inventory 116 (e.g., vending hardware 168 and inventory 170 as depicted in FIG. 3) for performing vending functions and electronically tracking vending information. Vending machines 150 may provide various types of products to customers such as soft drinks, snacks, etc.

As previously discussed with respect to FIG. 3, each vending machine 150 may include a IP network interface 157 coupled to IP network 124 and an audit device 154 coupled to and interfacing with vending hardware and inventory 116. Also, in some embodiments audit device 154 may comprise IP network interface 157. Each IP network interface 157 may include a wireless and/or wire-line interface and a transceiver for communications with IP network 124 via wireless or wire-line transmissions 121. Vending machines 150 may also be equipped with a controller, e.g., vending machine controller 52, for controlling vending operations as well as tracking some vending events such as money received, change given and number of vends from each slot. Audit devices 154 may communicate with such controllers and directly sense other vending events and vending equipment parameters (e.g., compressor performance).

As shown in FIG. 4, a host device 136 may communicate with one or more vending machines 150 across IP network 124. Host device 136 may comprise any suitable network interface 135 for communicating data over IP network 124. For example, network interface 135 may be operable to communicate over IP network 124 using any IP-compliant protocol, including without limitation hypertext transfer protocol (HTTP), file transfer protocol (FTP), simple mail transfer protocol (SMTP), simple object access protocol (SOAP), and simple network management protocol (SNMP). In addition, network interface 135 may include a wireless and/or wire-line interface and a transceiver for communications with IP network 124 via wireless or wire-line transmissions.

In the embodiment depicted in FIG. 4, host device 136 may comprise a web browser 137 and/or data center management software 139. Web browser 137 may be configured to display operation data transmitted from one or more IP network interfaces 157 to host device 136. In addition, web browser 137 may be configured to allow a user of host device 136 to alter operation data and transmit the operation data to one or more IP network interfaces 157 of vending machines 150.

Data center management software 139 may be configured to display operation data for a plurality of vending machines 150 and other networked devices on host device 136. For example, data center management software 139 may allow a user of host device 136 to display information on host device 136 regarding numerous vending machines, in accordance with simple network management protocol (SNMP). For example, in certain embodiments, host device 136 may serve as a manager or management station in an SNMP architecture, while vending machines 150 and other networked devices may serve master agents or subagents in the SNMP architecture, or execute master agent or subagent software.

Host device 136 may include any system or apparatus operable to communicate with one or more vending machines 150 across IP network 124. As used in this disclosure, "host device" may include, without limitation, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, host device 136 may be a personal computer, a personal digital assistant, a consumer electronic device, a server, a network storage device, or any other suitable device and may vary in size, shape, performance, functionality, and price. Host device 136 may include memory, one or more processing resources such as a central processing unit (CPU), or hardware or software control logic. Host device 136 may also include one or more storage devices, one or more communications ports for communicating with external devices as well as various input and output (I/O) devices, such as a keyboard, a mouse, and a video display. Host device 136 may also include one or more buses operable to transmit communication between the various hardware components.

System 110 may also comprise domain name service 140. Domain name service 140, e.g., DynDNS® available from Dynamic Network Services, Inc., may be operable to translate a uniform resource locator (URL) into an IP address corresponding to an IP network interface 157 of a vending machine 150, or otherwise permit host device 136 to address an IP network interface 157 by a fixed URL regardless of whether the IP address for the IP network interface is static or dynamic. For example, domain name service 140 may allow host device 136 to address a particular IP network interface 157 using a fixed URL, such as http://machine001.austin.isochron.com. If, for any reason, the IP associated with the particular IP network interface 157 should change (e.g., a network interface card is changed, or IP addresses are assigned to individual IP network addresses using Dynamic Host Configuration Protocol (DHCP)), such IP network interface 157, and thus the particular vending machine 150 associated with the particular IP network interface, will remain addressable by the same URL.

Although while FIGS. 3 and 4 contemplate communication between a host device and vending machines, it is understood that the systems and methods disclosed herein are equally applicable to communication between a host device and any type of machine that may require routine maintenance, monitoring and servicing, e.g., industrial machines. Also, although only one host device 136 is depicted in FIG. 4, it is understood that system 110 may be implemented with any number of host devices 136.

Although the present disclosure and its advantages have been described in detail, it should be understood that various changes, substitutions and alterations may be made thereto without departing from the spirit and scope of the disclosure as defined by the following claims.

What is claimed is:

1. A remote data acquisition and transmission system for vending machines, comprising:
 a vending machine comprising:
  a vending machine controller; and an Internet Protocol (IP) network interface operable to communicate operation data to and from the vending machine controller, the IP network interface comprising at least one of an IP server and a web server;
 at least one host device communicatively coupled to the IP network interface via at least one IP network, the host device operable to communicate operation data to and from the IP network interface.

2. The system of claim 1, the at least one IP network operable to communicate operation data between the at least one host device and the IP network interface using at least one protocol selected from the group consisting of hypertext transfer protocol (HTTP), file transfer protocol (FTP), simple mail transfer protocol (SMTP), simple object access protocol (SOAP), and simple network management protocol (SNMP).

3. The system of claim 1, wherein the IP network interface comprises the IP server.

4. The system of claim 3, the IP server operable to generate electronic mail comprising operation data to the host.

5. The system of claim 1, the IP network interface comprises the web server configured to communicate web pages via over the at least one IP network.

6. The system of claim 5, the web pages comprising operation data.

7. The system of claim 1, the host device comprising a web browser operable to display operation data.

8. The system of claim 7, the web browser further operable to alter operation data.

9. The system of claim 1, wherein the IP network interface is addressable by an IP address, and the system further comprises a domain name service operable to permit the at least one host device to address the IP network interface by a fixed uniform resource locator (URL), regardless of whether the IP address for the IP network interface is static or dynamic.

10. The system of claim 1, further comprising: the IP network supported by wireless transmissions; and
 the IP network interface comprising a wireless transceiver for communicating via the IP network.

11. The system of claim 1, further comprising: the IP network supported by wire-line transmissions; and
 the IP network interface comprising a wire-line transceiver for communicating via the IP network.

12. The system of claim 1, the operation data comprising at least one of: (a) dispensing and inventory data, (b) cash levels, and (c) equipment status data.

13. The system of claim 1, the vending machine comprising a beverage dispensing device.

14. The system of claim 1, wherein the vending machine controller comprises the IP network interface.

15. The system of claim 1, the vending machine further comprising an audit device, the audit device comprising the IP network interface.

16. The system of claim 1, the host device comprising a simple network management protocol (SNMP) management station.

17. The system of claim 16, the vending machine comprising an SNMP agent or subagent.

18. A method of remote data acquisition and transmission, comprising:
 interfacing at least one Internet Protocol (IP) network interface with a remote vending machine, the IP network interface comprising at least one of an IP server and a web server, the IP network interface operable to communicate operation data to and from the remote vending machine;
 communicatively coupling the IP network interface to a host device operable to communicate operation data to and from the IP network interface;
 communicating operation data between the IP network interface and the remote vending machine; and
 communicating operation data between the host device and the IP network interface.

19. The method of claim 18, wherein communicating operation data between the host device and the IP network interface comprises communicating operation data using at least one protocol selected from the group consisting of hypertext transfer protocol (HTTP), file transfer protocol (FTP), simple mail transfer protocol (SMTP), simple object access protocol (SOAP), and simple network management protocol (SNMP).

20. The method of claim 18, further comprising displaying the operation data on the host device.

21. The method of claim 18, further comprising altering the operation data using a web browser.

22. The method of claim 18, further comprising permitting the host device to address the IP network interface by a fixed uniform resource locator (URL), regardless of whether an IP address associated with the IP network interface is static or dynamic.

23. The method of claim 18, wherein communicating operation data between the host device and the IP network interface comprises communicating operation data over a wireless network.

24. The method of claim 18, wherein communicating operation data between the host device and the IP network interface comprises communicating operation data over a wire-line network.

25. The method of claim 18, the operation data comprising at least one of: (a) dispensing and inventory data, (b) cash levels, and (c) equipment status data.

26. The method of claim 18, the vending machine comprising a beverage dispensing device.

27. A vending machine comprising:
 a controller operable to control operations of the vending machine and to monitor vending machine operation data;
 an audit device comprising:
 a multi-drop bus (MDB) interface for communicating with an MDB interface of the controller; and
 a data exchange (DEX) interface in for communicating with a DEX interface of the controller; and
 an Internet Protocol (IP) network interface comprising at least one of an IP server and a web server, the IP network interface configured to communicate operation data with an IP network.

28. The vending machine of claim 27, the IP network interface operable to communicate operation data with the IP network using at least one protocol selected from the group consisting of hypertext transfer protocol (HTTP), file transfer protocol (FTP), simple mail transfer protocol (SMTP), simple object access protocol (SOAP), and simple network management protocol (SNMP).

29. The vending machine of claim 27, the IP network interface comprising the IP server.

30. The vending machine of claim 29, the IP server operable to generate emails comprising operation data.

31. The vending machine of claim 27, the IP network interface comprising the web server configured to communicate web pages via over the at least one IP network.

32. The vending machine of claim 31, the web pages comprising operation data.

33. The vending machine of claim 27, the IP network interface further operable to, via the 1P network, communicate operation data to a host device operable to display the operation data.

34. The vending machine of claim 27, the IP network interface further operable to, via the IP network, receive operation data from a host device operable to alter the operation data.

35. The vending machine of claim 27, wherein the IP network interface is addressable by an IP address, and the IP network interface is configured to be communicatively coupled to a domain name service operable to permit a host device communicatively coupled to the IP network interface to address the IP network interface by a fixed uniform resource locator (URL), regardless of whether the IP address for the IP network interface is static or dynamic.

36. The vending machine of claim 27, further comprising: the IP network interface operable to communicate via wireless transmissions; and
 the IP network interface comprising a wireless transceiver for communicating via the IP network.

37. The vending machine of claim 27, further comprising: the IP network operable to communicate via wire-line transmissions; and
 the IP network interface comprising a wire-line transceiver for communicating via the IP network.

38. The vending machine of claim 27, the operation data comprising at least one of: (a) dispensing and inventory data, (b) cash levels, and (c) equipment status data.

39. The vending machine of claim 27, the vending machine comprising a beverage dispensing device.

40. The vending machine of claim 27, wherein the vending machine controller comprises the IP network interface.

41. The vending machine of claim 27, wherein the audit device comprises the IP network interface.

42. The vending machine of claim 27, further comprising a simple network management protocol (SNMP) agent or sub-agent.

43. An audit device for auditing a vending machine, the audit device comprising:
 a multi-drop bus (MDB) interface for communicating with an MDB interface of a vending machine controller (VMC) in the vending machine;
 a data exchange (DEX) interface in for communicating with a DEX interface of the VMC in the vending machine; and
 an Internet Protocol (IP) network interface comprising at least one of an IP server and a web server, the IP network interface configured to communicate operation data with an IP network.

44. The audit device of claim 43, the IP network interface operable to communicate operation data with the IP network using at least one protocol selected from the group consisting of hypertext transfer protocol (HTTP), file transfer protocol (FTP), simple mail transfer protocol (SMTP), simple object access protocol (SOAP), and simple network management protocol (SNMP).

45. The audit device of claim 43, the IP network interface comprising an IP server.

46. The audit device of claim 45, the IP server operable to generate emails comprising operation data.

47. The audit device of claim 43, the IP network interface comprising a web server.

48. The system of claim 47, the web server operable to serve web pages comprising operation data.

49. The audit device of claim 43, the IP network interface further operable to, via the IP network, communicate operation data to a host device operable to display the operation data.

50. The audit device of claim 43, the IP network interface further operable to, via the IP network, receive operation data from a host device operable to alter the operation data.

51. The audit device of claim 43, wherein the IP network interface is addressable by an IP address, and the IP network interface is configured to be communicatively coupled to a domain name service operable to permit a host device communicatively coupled to the IP network interface to address the IP network interface by a fixed uniform resource locator (URL), regardless of whether the IP address for the IP network interface is static or dynamic.

52. The audit device of claim 43, further comprising: the IP network interface operable to communicate via wireless transmissions; and
 the IP network interface comprising a wireless transceiver for communicating via the IP network.

53. The audit device of claim 43, further comprising: the IP network operable to communicate via wire-line transmissions; and
   the IP network interface comprising a wire-line transceiver for communicating via the IP network.

54. The audit device of claim 43 further comprising a simple network management protocol (SNMP) agent or sub-agent.

* * * * *